(12) United States Patent
Senofonte et al.

(10) Patent No.: US 7,685,825 B2
(45) Date of Patent: Mar. 30, 2010

(54) AXIALLY SPLIT NOZZLE LINER FOR CONVERGENT NOZZLE

(75) Inventors: Paul R. Senofonte, Portland, CT (US); Andrew D. Burdick, Ellington, CT (US); Richard F. Norman, West Warren, MA (US); Kyle J. Osga, Windham, CT (US)

(73) Assignee: United Technologies Corporation, Hartford, CT (US)

( * ) Notice: Subject to any disclaimer, the term of this patent is extended or adjusted under 35 U.S.C. 154(b) by 698 days.

(21) Appl. No.: 11/540,279

(22) Filed: Sep. 29, 2006

(65) Prior Publication Data

US 2009/0313998 A1 Dec. 24, 2009

(51) Int. Cl.
*F02K 1/00* (2006.01)
(52) U.S. Cl. .................. 60/771; 60/770; 239/265.39
(58) Field of Classification Search ............ 60/770, 60/771, 226.1; 239/265.33, 265.37, 265.39, 239/265.41
See application file for complete search history.

(56) References Cited

U.S. PATENT DOCUMENTS

| 4,541,567 A | * | 9/1985 | Jourdain et al. ......... 239/265.37 |
| 4,641,783 A | * | 2/1987 | Camboulives .......... 239/265.39 |
| 5,893,518 A | * | 4/1999 | Bruchez et al. ......... 239/265.39 |
| 2005/0005608 A1 | * | 1/2005 | Pancou et al. .................. 60/771 |

* cited by examiner

*Primary Examiner*—Michael Cuff
*Assistant Examiner*—Vikansha S Dwivedi
(74) *Attorney, Agent, or Firm*—Carlson, Gaskey & Olds

(57) ABSTRACT

A convergent/divergent nozzle for a gas turbine engine includes liners that are attached to the convergent flaps and seals. The liner is formed of two separate plates. By splitting the liner into two separate plates, a thermal break is provided between the two. Thermal stresses on a downstream plate are not as readily transferred to an upstream plate. External stresses on the upstream plate are not transferred as readily to the downstream plate. The two liner plate portions, and a separate backing plate all have faces that abut and are riveted together. These faces provide a flow blocker to maintain a lower pressure downstream of the flow blocker.

20 Claims, 5 Drawing Sheets

AXIALLY SPLIT NOZZLE LINER FOR CONVERGENT NOZZLE

This invention was made with government support under U.S. Navy Contract No. N00019-02-C-3003. The government therefore has certain rights in this invention.

BACKGROUND OF THE INVENTION

This application relates to liners for the convergent flaps and seals which are part of a convergent/divergent nozzle for a gas turbine engine, and wherein the liners are formed of two separate plates.

A gas turbine engine typically includes a plurality of sections, which are positioned in series. A fan section moves air downstream towards a compressor section. The compressor section compresses the air and delivers it into a combustion section. In the combustion section, air and fuel are mixed and combusted. Products of combustion pass downstream over turbines, and then outwardly through a nozzle.

It is known in the prior art to vary the cross-sectional area of the nozzle by having flaps that pivot inwardly and outwardly. Typically, a plurality of circumferentially spaced flaps and seals are positioned upstream of a throat, and are called the convergent flaps and seals. Downstream of the throat are divergent flaps and seals. The convergent flaps and seals not only move to define the throat area, but they also provide a block for the products of combustion reaching a housing outboard of the flaps and seals.

In the structure for the convergent flaps and seals, a liner typically faces the products of combustion. The liner is connected by a bracket to the flap or seal.

In the prior art, the liners have been subject to high thermal and external loads. In particular, the liner extends over a portion of the length of the nozzle, and as one moves downstream in the nozzle, the liner is subject to greater heat. This is true for several reasons, one being the fact that cooling air is mixed into the nozzle at a position upstream. This cooling air has lesser and lesser effects as one moves downstream.

The liner is subjected to thermal stresses from this thermal gradient along its length. An aft, or downstream edge, of the liner is hotter than a forward curled edge. Thermal stress from the more aft portion is transferred forward toward the forward edge. On the other hand, external loads such as from structure for moving the liner and the associated seal or flap are largely on the upstream of forward portion. These external loads are transferred back toward the aft portion.

Typically, a backing sheet has been attached to the liner by rivets, which are in tension. It is undesirable to have rivets loaded in tension.

In the prior art, a separate plate has been utilized to provide a flow blocker to maintain a higher pressure forward, or upstream, of the flow blocker, and the lower pressure downstream of the flow blocker. The requirement of this separate flow blocker plate adds additional structure, which is undesirable.

SUMMARY OF THE INVENTION

In a disclosed embodiment of this invention, a liner for being connected to a convergent flap and seal is formed of two plates that are split along an axial span-wise flange. By splitting the liner into two plates, the thermal stresses on an aft plate are separated from the external stresses on a forward plate. A break between the two is provided.

In disclosed embodiments, the two plates of the liner, along with the backing sheet, all have abutting faces that provide openings for rivets to secure the three plates. Generally, the rivets extend parallel to the direction of the thermal gradient. These rivets are loaded in shear, which is preferable to loading rivets in tension. Further, the abutting faces of the three plates form the flow blocker such that a separate flow blocker is not necessary.

These and other features of the present invention can be best understood from the following specification and drawings, the following of which is a brief description.

DETAILED DESCRIPTION OF THE PREFERRED EMBODIMENT

Figure 1:
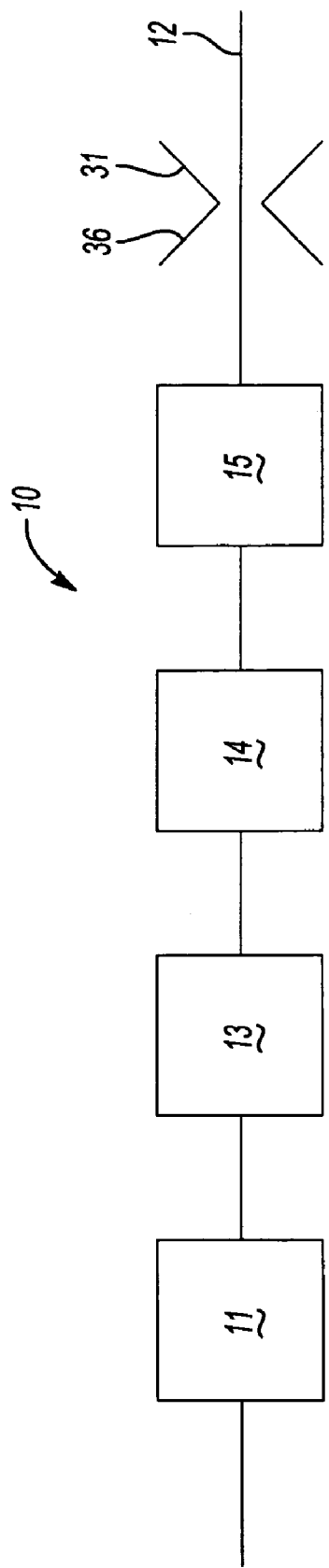
FIG. 1 is a schematic view of a jet engine as known in the prior art.

FIG. 1 shows a gas turbine engine 10. As known, a fan section 11 moves air and rotates about an axial center line 12. A compressor section 13, a combustion section 14, and a turbine section 15 are also centered on the axial center line 12. A nozzle section aft of the turbine discharges gas downstream. A convergent section 36 leads into a throat and a divergent section 31 leads away. FIG. 1 is a schematic view, however, it does show the main components of the gas turbine engine.

Figure 2:
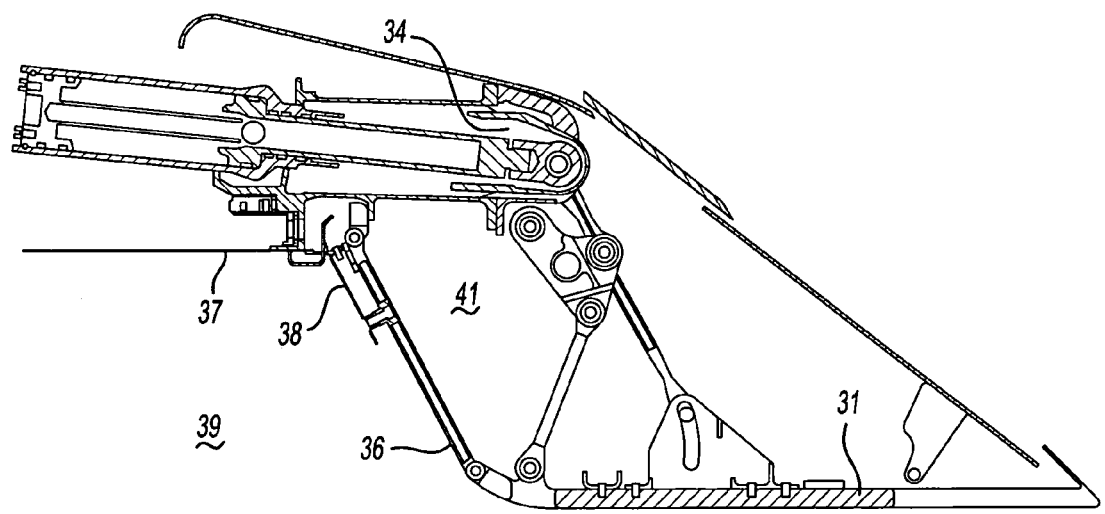
FIG. 2 shows a portion of a structure for adjusting the cross-sectional area of a nozzle.

FIG. 2 shows a prior art structure to change a cross-sectional area of the nozzle. As known, an actuator 34 drives a piston to cause the divergent section 31 and the convergent section 36 to pivot to change the cross-sectional area of the throat between the two. This structure is shown schematically, and may be as known in the art.

As shown at 36, convergent flaps and seals extend from a pivotal connection to the divergent section 31, and upwardly to a housing 37. This structure prevents hot gasses from an area 39 inward of the convergent section 36 from reaching a housing 41 housing the linkages and actuator 34. As known, a liner 38 faces the hot gas, and provides some thermal protection for the flap and seals 36.

Figure 3:
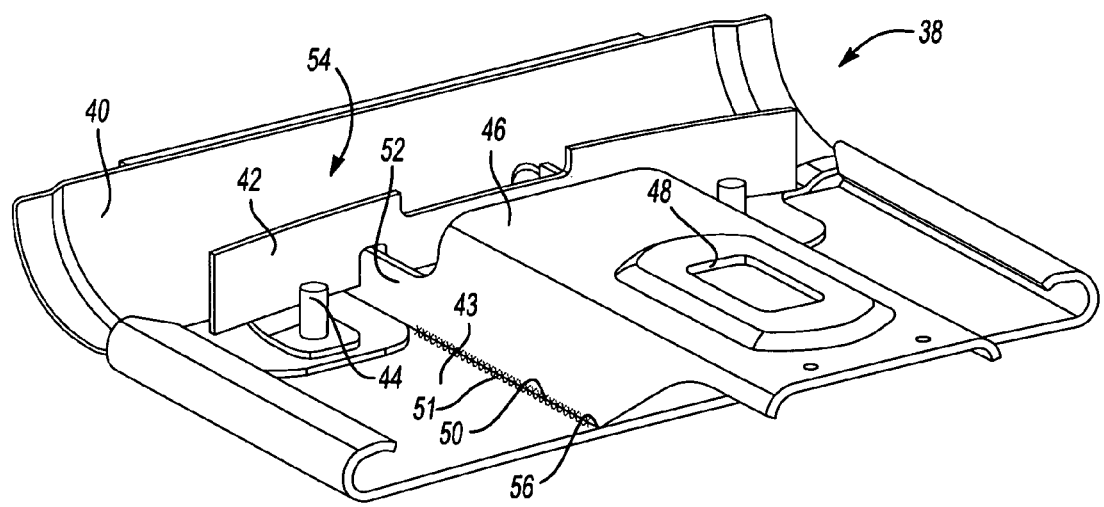
FIG. 3 shows a liner as known in the prior art.

As shown at 38 in FIG. 3, in the prior art, this liner included a backing plate 40, a separate dam or flow blocker 42, and rivets 44 attaching the plate 40 and flow blocker 42 to an underlying plate 43.

A bracket 46 includes an opening 48 to secure the liner 38 to the flap or seal. In addition, a lower surface 50 of the bracket 46 is welded at 51 to the plate 43 along its entire length. A forward portion 52 of the bracket 46 extends beyond the dam 42. As known, the flow blocker 42 provides a pressure differential between an upstream area forward of the dam 42, and a downstream area adjacent to the bracket 46.

As explained above, in this prior art structure, an upstream end 54 of the bracket 46 is cooler than a downstream end 56. Thus, there is a thermal gradient along the lower surface 50 and the weld joint 51. This causes stresses and other challenges. The prior art has addressed these challenges by forming the liner plate 43 and bracket 46 out of materials such as columbium, which have low coefficients of thermal expansion (CTE). However, recently, it has become desirable to have more freedom in the material selected for the liner. In one liner, it is desirable to use INCO 625, which has a relatively high CTE.

In particular, thermal stresses from the downstream or aft edge 56 of the liner are transferred back toward the upstream or forward curled edge 54. On the other hand, external loads placed adjacent the forward edge are transferred back to the downstream or aft edge. In addition, the flow blocker 42 is formed by a separate plate. Rivets 44, which secure the flow blocker 42, the backing plate 40 and the liner 43 extend generally perpendicular to the thermal gradient, and are loaded in tension. It is undesirable to load rivets in tension.

Figure 4:
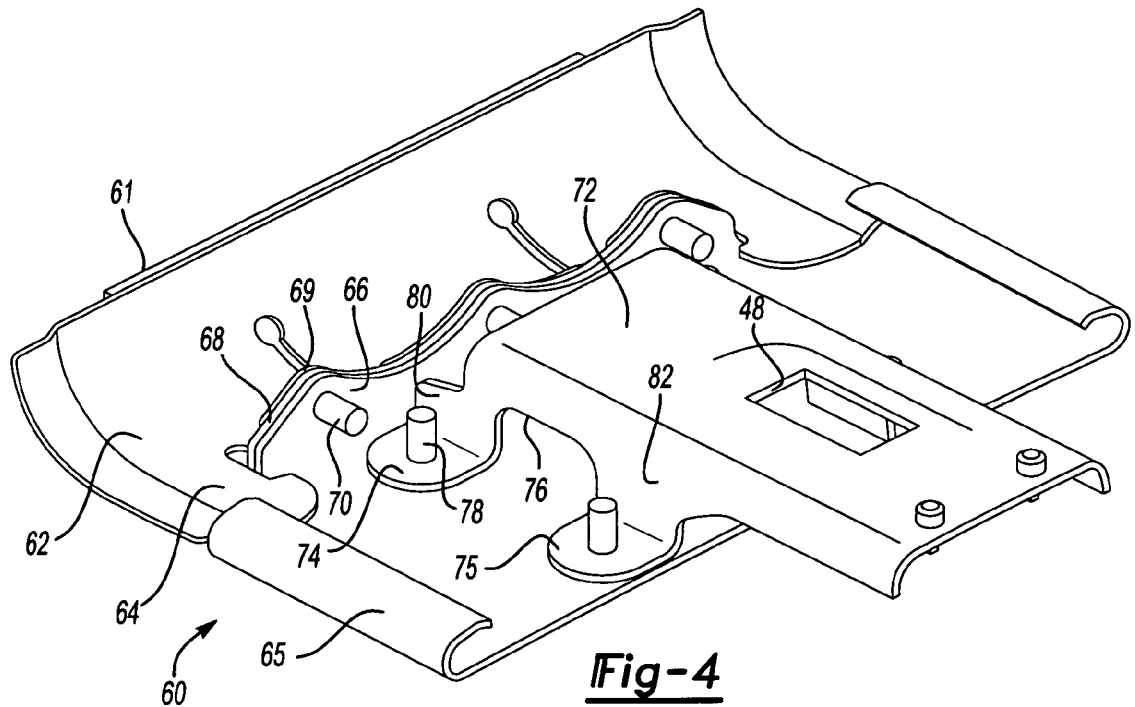
FIG. 4 shows an improved liner.

As shown in FIG. 4, an inventive liner and bracket assembly 60 includes a pair of plates 61 and 65. A leg 64 on the backing plate 62 extends rearwardly or downstream. Plate 65 has a rear face 66 abutting faces 68 and 69 from the plates 61 and 62. As is clear, legs 64 extend downstream and beyond faces 68 and 69. As shown, a rivet 70 connects the three plates. The rivet extends generally parallel to the direction of the thermal gradient, and is loaded in shear. It is desirable to have a rivet loaded in shear. Moreover, a thermal break is provided between the plates 61 and 65. The external forces on the forward plate 61 are not transferred as readily to the rear plate 65. Conversely, the thermal stresses placed on the rear plate 65 are not transferred as readily to the forward plate 61. As can be appreciated, the mating faces 66, 68 and 69 extend along a plane which has at least a component that is perpendicular to a direction defined from a downstream end to an upstream end of the liner and bracket assembly 60.

The bracket 72 has spaced legs 74 and 75 along with an intermediate notch 76. A second pair of legs 74 and 75 is on the opposed end of the bracket. Rivets 78 secure the bracket 72 to the plate 65. Due to the notch 76, there are axially spaced legs 74 and 75, which contact the hot plate 65, reducing the footprint or contact area compared to the prior art. Notch 76 results in an area spaced away from the hot plate 65. Now, when the downstream end of the bracket is subjected to greater heat than the upstream end, the spaced legs can allow some adjustment, such as by the leg 75 expanding away from the leg 74, but with the expansion being compensated for within the notch 76. Further, the inventive bracket 72 will provide some circumferential adjusting ability also due to the rivet connection at 78. Further details of these features are better disclosed in a co-pending patent application entitled "Gas Turbine Engine Nozzle Liner with Thermally Compliant Attachment Brackets," filed on even date herewith, and assigned Ser. No. 11/540,310. An alternative rivet arrangement is disclosed in the co-pending patent application entitled "Thermally Compliant Rivet Connection for Connecting Turbine Engine Liner to Convergent Flap and Seal for Turbine Nozzle," filed on even date herewith and assigned Ser. No. 11/540,309.

Figure 5:
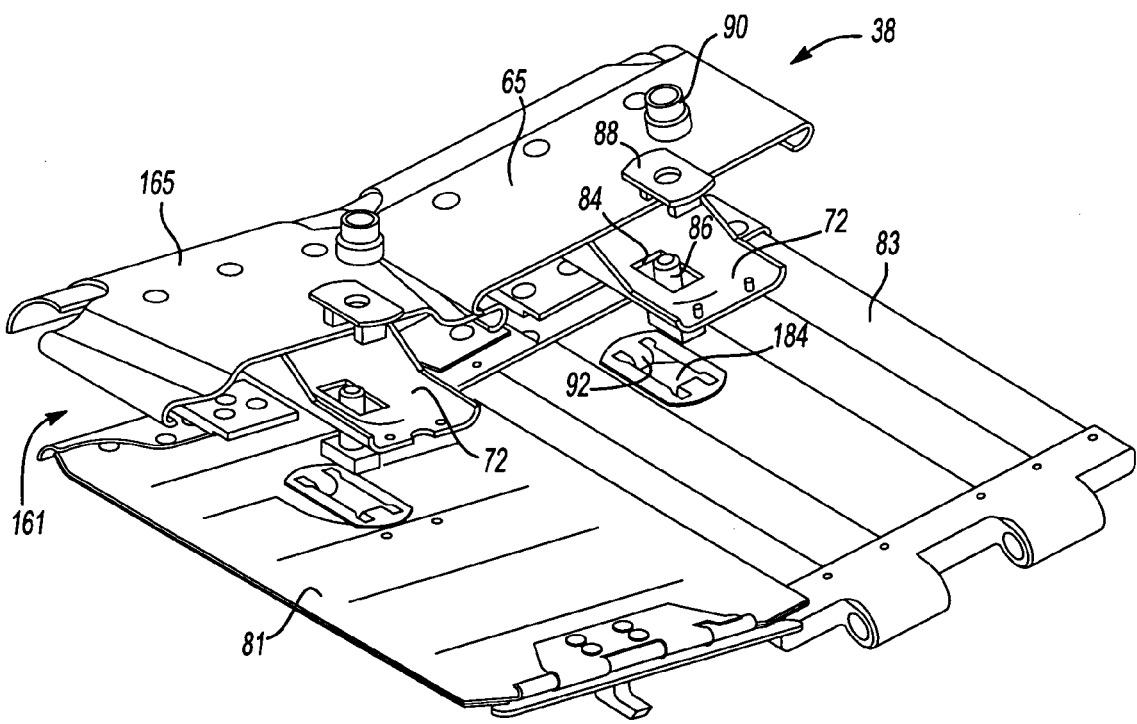
FIG. 5 is an exploded view of a convergent flap and seal along with the liners and attachment hardware.

As shown in FIG. 5, a liner and bracket assembly 38 is secured to an underlying convergent flap 83. As known, an opening 184 in the flap 83 receives a bolt 86 through the opening 84 in the bracket 72. A washer 88 and nut 90 secure the bolt. The opening 184 in the flap 83 has spring fingers 92 which serve to hold the washer 88 during assembly. Features of this structure can be best understood from the co-pending application entitled "Quick Change Fastener System for Attaching Liner Bracket to Convergent Flap and Seal in Turbine Nozzle," filed on even date herewith, and assigned Ser. No. 11/529,836. The structure of the liner and bracket as shown in FIG. 5 is the prior art structure. This view is intended to provide an understanding of how the combined liner and bracket assembly is attached to the flap or seal. However, the quick change coupling is inventive.

A similar bracket and liner arrangement 161 has hot plate 165, and is attached to a seal 81, again through an arrangement similar to that shown with regard to the flap 83.

Figure 6:
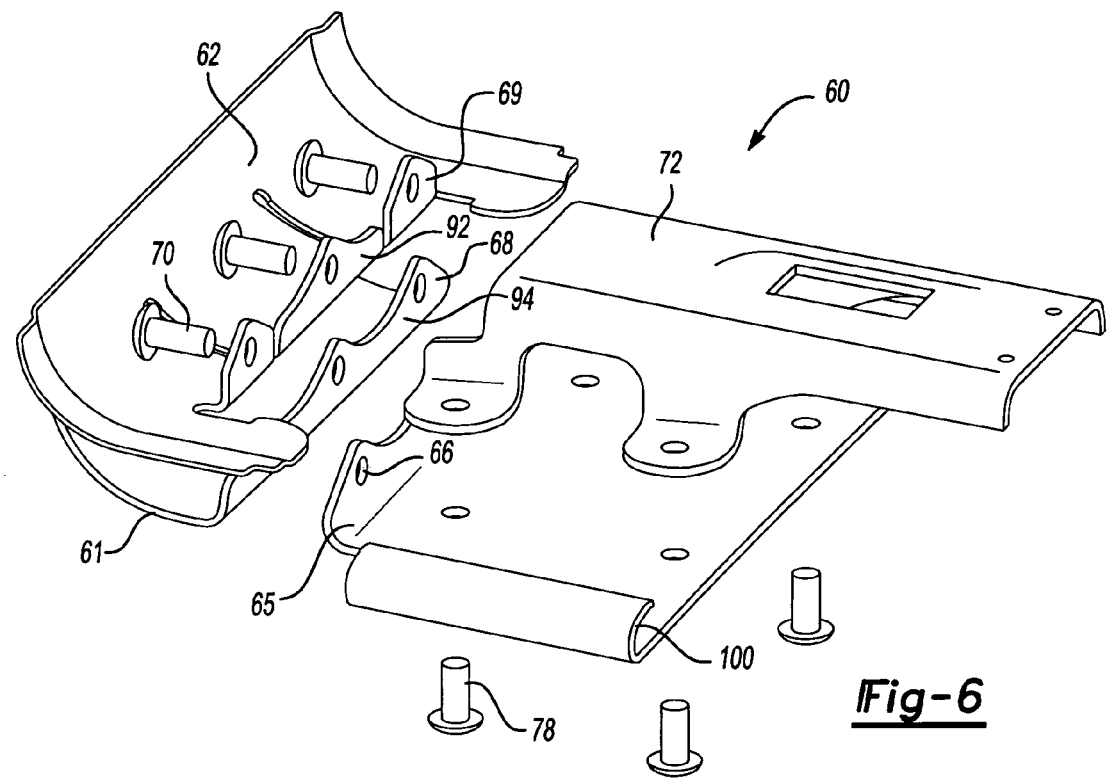
FIG. 6 is an exploded view of the improved flap liner.

FIG. 6 is an exploded view of the liner and bracket assembly 60. As can be appreciated, the bracket 72 is positioned on the plate 65. The rivets 70 secure the plates 61, 62 and 65.

Figure 7:
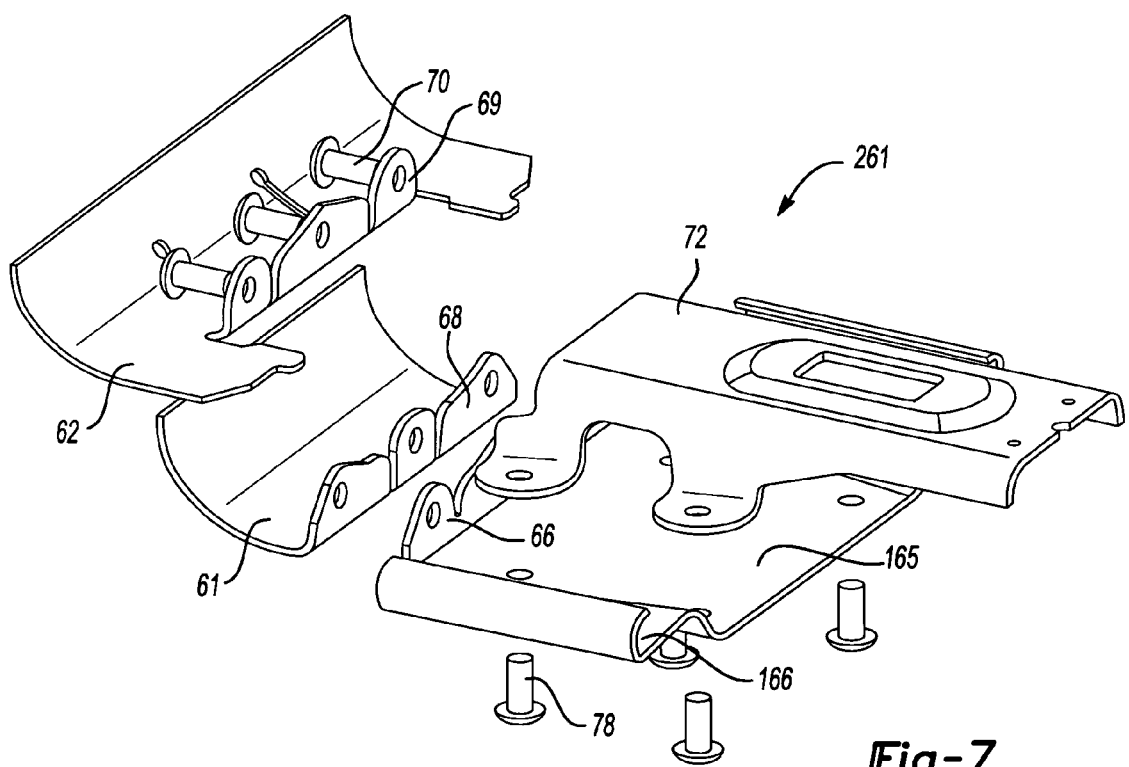
FIG. 7 is an exploded view of the improved seal liner.

The plate 65 has a turned in end 100. FIG. 7 shows the similar liner and bracket assembly 261. In general, the difference is that the plate 165 has a more complex, turned in end 166.

As can be appreciated from FIGS. 4, 6 and 7, the plates 61, 65 (or 165) are formed separately. The faces 68, 69 and 66 are riveted together by rivets 70. With this arrangement, the rivets are loaded in shear, which is preferable to being loaded in tension. As can be appreciated from FIG. 4, for example, the combination of these three faces provides the flow blocker or dam which required a separate plate in the prior art. As known, a lower pressure is maintained downstream of the flow blocker, adjacent the bracket 72, than is maintained upstream, or to the forward side of the flow blocker.

Figure 8:
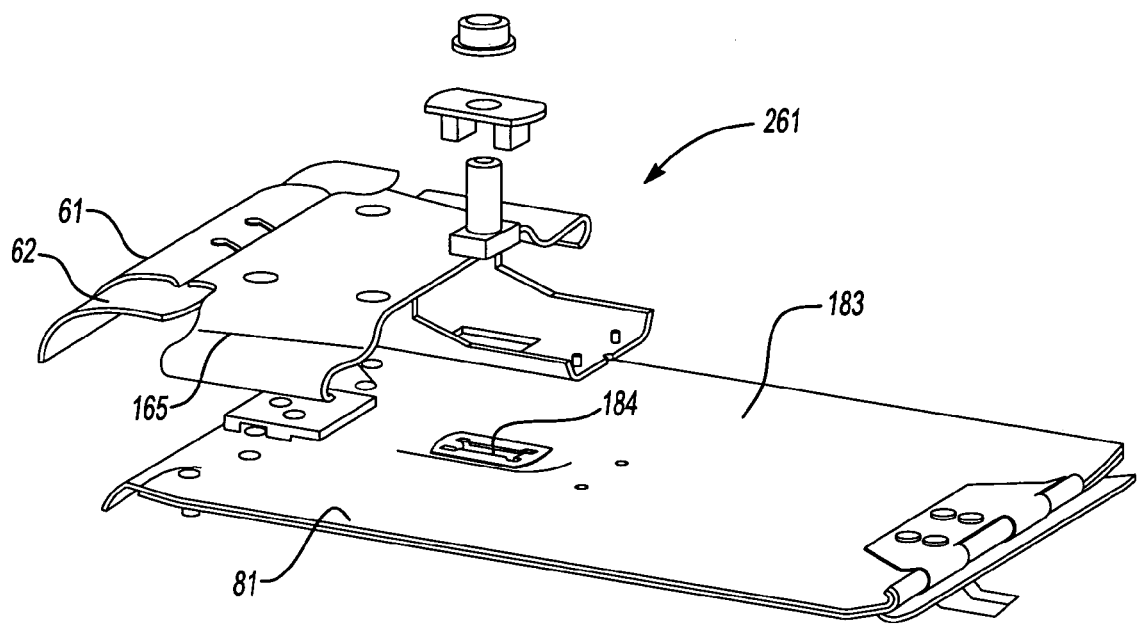
FIG. 8 is an exploded view of the seal.
Figure 9:
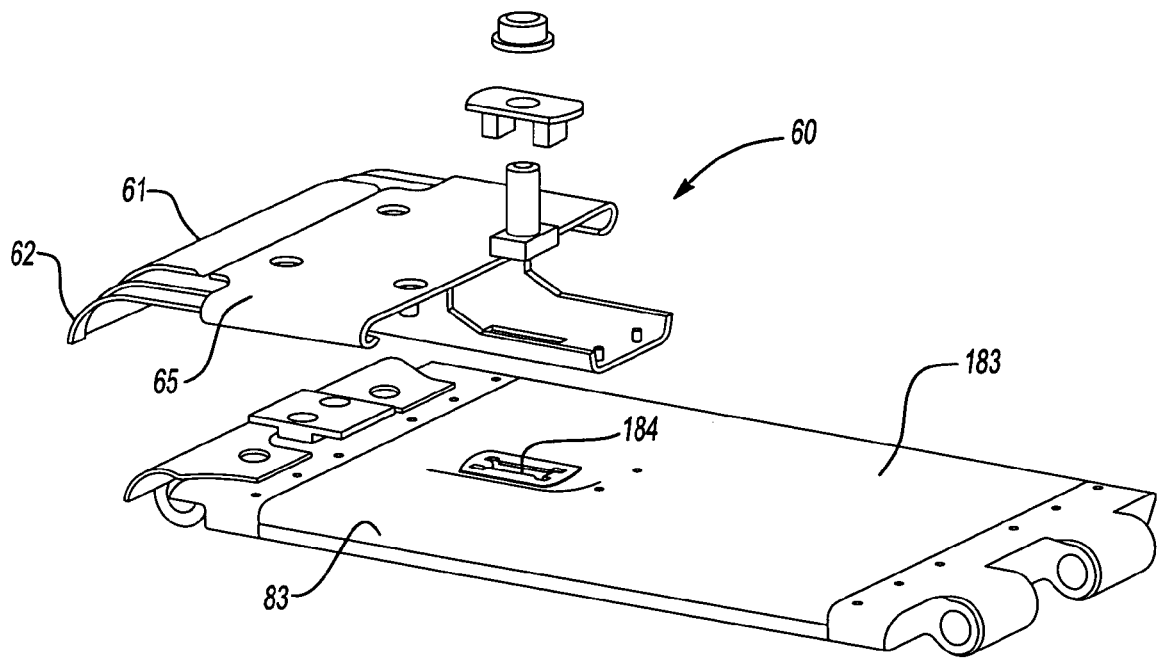
FIG. 9 is an exploded view of the flap.

FIG. 8 shows an exploded view of the components of the liner and bracket 261 to the convergent seals 81. FIG. 9 shows a similar exploded view of the components of the bracket and liner 60 being attached to the convergent flap 83.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle assembly for a gas turbine engine comprising:
   a plurality of divergent flaps that are movable to adjust a cross-sectional area of an outlet of a nozzle;
   a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals; and
   said convergent flaps and seals being connected to a liner facing inwardly and toward products of combustion, said liner being attached to said convergent flaps and seals by a bracket, said liner receiving a backing plate adjacent an upstream portion, said backing plate being positioned radially outward of an upstream liner portion, and said bracket being secured to a downstream liner portion, with said upstream and downstream liner portions being separate components providing a thermal break between the two.

2. The nozzle assembly as set forth in claim 1, wherein said upstream liner portion and said downstream liner portion have faces that abut to provide a flow blocker to maintain a lower pressure adjacent said bracket.

3. The nozzle assembly as set forth in claim 2, wherein said backing plate further having a face abutting said face on said upstream liner portion.

4. The nozzle assembly as set forth in claim 3, wherein rivets secure said faces of said backing plate, said upstream liner portion and said downstream liner portion.

5. The nozzle assembly as set forth in claim 4, wherein said rivets extend generally parallel to a direction of a thermal gradient from a downstream location toward an upstream location.

6. The nozzle assembly as set forth in claim 5, wherein said rivets are loaded in shear.

7. A gas turbine engine comprising:
a fan section;
a compressor section;
a combustion section;
a turbine section; and
a nozzle section, said nozzle including a plurality of divergent flaps that are movable to adjust a cross-sectional area of an outlet of a nozzle, a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, said convergent flaps and seals being connected to a liner facing inwardly and toward products of combustion, said liner being attached to said convergent flaps and seals by a bracket, said liner receiving a backing plate adjacent an upstream portion, said backing plate being positioned radially outward of an upstream liner portion, and said bracket being secured to a downstream liner portion, with said upstream and downstream liner portions being separate components providing a thermal break between the two.

8. The gas turbine engine as set forth in claim 7, wherein said upstream liner portion and said downstream liner portion have faces that abut to provide a flow blocker to maintain a lower pressure adjacent said bracket.

9. The gas turbine engine as set forth in claim 8, wherein said backing plate further having a face also abutting said faces on said upstream and downstream liner portions.

10. The gas turbine engine as set forth in claim 9, wherein rivets secure said faces of said backing plate, said upstream liner portion and said downstream liner portion.

11. The gas turbine engine as set forth in claim 10, wherein said rivets extend generally parallel to a direction of a thermal gradient from a downstream location toward an upstream location.

12. The gas turbine engine as set forth in claim 11, wherein said rivets are loaded in shear.

13. The nozzle assembly as set forth in claim 3, wherein said upstream liner portion has its face intermediate the faces of said downstream liner portion and said backing plate.

14. The nozzle assembly as set forth in claim 2, wherein said faces extending in a plane having at least a component along a direction from a generally upstream end to a generally downstream end of said nozzle assembly, such that the flow blocking maintains a lower pressure adjacent said bracket.

15. The nozzle assembly as set forth in claim 14, wherein rivets secure said faces of said upstream liner portion and said downstream liner portion and said rivets extending with at least a component that is parallel to the direction from the downstream location to the upstream location.

16. The gas turbine engine as set forth in claim 8, wherein said upstream liner portion has its face intermediate the faces of said downstream liner portion and said backing plate.

17. The gas turbine engine as set forth in claim 8, with said faces extending in a plane having at least a component along a direction from a generally upstream end to a generally downstream end of said nozzle assembly, such that the flow blocking maintains a lower pressure adjacent said bracket.

18. The gas turbine engine as set forth in claim 17, wherein rivets secure said faces of said upstream liner portion and said downstream liner portion and said rivets extending with at least a component that is parallel to the direction from the downstream location to the upstream location.

19. The nozzle as set forth in claim 1, wherein said upstream liner portion having a leg extending in a downstream direction beyond a location of said face on said downstream liner portion, such that there are legs positioned on each of two sides of said downstream liner portion.

20. A nozzle assembly for a gas turbine engine comprising:
a plurality of divergent flaps that are movable to adjust a cross-sectional area of an outlet of a nozzle;
a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals; and
said convergent flaps and seals being connected to a liner facing inwardly and toward products of combustion, said liner being attached to said convergent flaps and seals by a bracket, said liner receiving a backing plate adjacent an upstream portion, said backing plate being positioned radially outward of an upstream liner portion, and said bracket being secured to a downstream liner portion, with said upstream and downstream liner portions being separate components providing a thermal break between the two, with said upstream and downstream liner portions having faces that abut to provide a flow blocker, with said faces extending in a plane having at least a component along a direction from a generally upstream end to a generally downstream end of said nozzle assembly, such that the flow blocking maintains a lower pressure adjacent said bracket;
said upstream liner portion and said downstream liner portion have faces that abut to provide a flow blocker to maintain a lower pressure adjacent said bracket;
said backing plate further having a face abutting said face on said upstream liner portion, rivets securing said faces of said backing plate, said upstream liner portion and said downstream liner portion, said rivets extend generally parallel to a direction of a thermal gradient from a downstream location toward an upstream location; and
said upstream liner portion having a leg extending in a downstream direction beyond a location of said face on said downstream liner portion, such that there are legs positioned on each of two sides of said downstream liner portion.

* * * * *